United States Patent
Asada

(10) Patent No.: US 12,284,055 B2
(45) Date of Patent: Apr. 22, 2025

(54) COMMUNICATION SYSTEM AND WORK APPARATUS

(71) Applicant: FUJI CORPORATION, Chiryu (JP)

(72) Inventor: Kazuhiro Asada, Tokai (JP)

(73) Assignee: FUJI CORPORATION, Chiryu (JP)

( * ) Notice: Subject to any disclaimer, the term of this patent is extended or adjusted under 35 U.S.C. 154(b) by 277 days.

(21) Appl. No.: 17/995,740

(22) PCT Filed: Apr. 10, 2020

(86) PCT No.: PCT/JP2020/016096
§ 371 (c)(1),
(2) Date: Oct. 7, 2022

(87) PCT Pub. No.: WO2021/205640
PCT Pub. Date: Oct. 14, 2021

(65) Prior Publication Data
US 2023/0163995 A1    May 25, 2023

(51) Int. Cl.
*H04L 12/433* (2006.01)
*H04L 12/417* (2006.01)
*H04L 12/46* (2006.01)

(52) U.S. Cl.
CPC ........ *H04L 12/433* (2013.01); *H04L 12/4625* (2013.01)

(58) Field of Classification Search
CPC ..... H04L 12/42; H04L 12/421; H04L 12/422; H04L 12/423; H04L 12/427; H04L 12/43; H04L 12/433; H04L 12/437; H04L 12/4625
See application file for complete search history.

(56) References Cited

U.S. PATENT DOCUMENTS

| | | |
|---|---|---|
| 5,331,636 A | 7/1994 | Yang et al. |
| 5,477,540 A | 12/1995 | Yang et al. |
| 5,481,538 A | 1/1996 | Yang et al. |

(Continued)

FOREIGN PATENT DOCUMENTS

| | | |
|---|---|---|
| CN | 1040473 A | 3/1990 |
| EP | 0 691 767 A2 | 1/1996 |

(Continued)

OTHER PUBLICATIONS

International Search Report issued Jun. 2, 2020 in PCT/JP2020/016096 filed on Apr. 10, 2020, 2 pages.

*Primary Examiner* — Jenee Holland
(74) *Attorney, Agent, or Firm* — Oblon, McClelland, Maier & Neustadt, L.L.P.

(57) ABSTRACT

In a communication system, multiple nodes sequentially transmit a data frame along a communication direction and can read and write data from and to the data frame, and includes a specific node requiring data in the data frame transmitted by another network. In one network of two networks connected to a common bridge, a specific node is disposed within a half circumference of disposition positions of the multiple nodes on the upstream side in the communication direction with respect to the bridge, and in the other network, the specific node is disposed within a half circumference of the disposition positions of the multiple nodes on the downstream side in the communication direction with respect to the bridge.

5 Claims, 5 Drawing Sheets

(56) References Cited

U.S. PATENT DOCUMENTS

| | | | |
|---|---|---|---|
| 5,537,413 A | 7/1996 | Yang et al. | |
| 6,374,316 B1 * | 4/2002 | James | H04L 12/6418 370/258 |
| 6,944,165 B2 * | 9/2005 | Fujiyama | H04L 49/90 370/443 |
| 9,049,097 B2 * | 6/2015 | Nakamura | H04L 12/417 |
| 2008/0140892 A1 | 6/2008 | Fong et al. | |
| 2008/0316918 A1 * | 12/2008 | Sakauchi | H04L 12/437 370/223 |
| 2011/0261725 A1 | 10/2011 | Nakamura et al. | |
| 2017/0041161 A1 * | 2/2017 | Kaku | H04L 12/437 |
| 2021/0160099 A1 * | 5/2021 | Rozenboim | H04L 45/16 |

FOREIGN PATENT DOCUMENTS

| | | |
|---|---|---|
| JP | 2-170639 A | 7/1990 |
| JP | 2007-318593 A | 12/2007 |
| JP | 2017-073812 A | 4/2017 |
| JP | 2018-196035 A | 12/2018 |

\* cited by examiner

COMMUNICATION SYSTEM AND WORK APPARATUS

TECHNICAL FIELD

The present specification discloses a communication system and a work apparatus.

BACKGROUND ART

Conventionally, a communication system including multiple networks in which multiple nodes are communicably connected in one direction via signal lines has been proposed (refer to Patent Literature 1, for example). In this system, utilization efficiency of a wavelength band for each path is improved by determining a wavelength and an operation timing to be assigned to each path in the network. In addition, in the communication system including the multiple nodes, it has been proposed to perform data communication by a token passing method in which tokens indicating transmission rights are circulated between nodes (refer to Patent Literatures 2 and 3, for example).

PATENT LITERATURE

Patent Literature 1: JP-A-2017-073812
Patent Literature 2: JP-A-2007-318593
Patent Literature 3: JP-A-2018-196035

BRIEF SUMMARY

Technical Problem

In the communication network described above, since a communication direction is limited to one direction, each node performs communication while transferring data in one direction in sequence. Therefore, depending on a disposition position of the node that transfers the data between the different networks, it takes time to transfer the necessary data, and thus, responsiveness may be reduced. In this case, there would be a problem caused by a decrease in responsiveness, such as a delay in an operation of hardware controlled by the node.

A main object of the present disclosure is to suppress a decrease in responsiveness in multiple token passing type networks in which a communication direction is one-way.

Solution to Problem

The present disclosure employs the following means in order to achieve the above-mentioned main object.

According to the present disclosure, there is provided a communication system including: multiple token passing type networks in which multiple nodes are disposed with one direction as a communication direction; and a bridge configured to communicatively connect the networks, in which the multiple nodes sequentially transmit a data frame along the communication direction, read and write data from and to the data frame, and include a specific node requiring data in the data frame transmitted by another network, the bridge transmits, in each of the networks of a connection destination, the data frame transmitted from the node on an upstream side to the node on a downstream side in the communication direction, reads data from the transmitted data frame, and writes the data to the data frame of another network to transmit the data, and in one network of the two networks connected to a common bridge, the specific node is disposed within a half circumference of disposition positions of the multiple nodes on the upstream side in the communication direction with respect to the bridge, and in the other network, the specific node is disposed within a half circumference of the disposition positions of the multiple nodes on the downstream side in the communication direction with respect to the bridge.

In the communication system of the present disclosure, in the one network of the two networks connected to the common bridge, the specific node is disposed within the half circumference on the upstream side in the communication direction with respect to the bridge, and in the other network, the specific node is disposed within the half circumference on the downstream side in the communication direction with respect to the bridge. As a result, it is possible to quickly transfer necessary data from the specific node of the one network to the specific node of the other network via the bridge by setting the disposition of the node as a disposition suitable for transfer of data between the specific nodes. Therefore, it is possible to promptly transfer data between specific nodes in multiple token passing type networks in which a communication direction is one-way to suppress a decrease in responsiveness.

DESCRIPTION OF EMBODIMENTS

Figure 1:
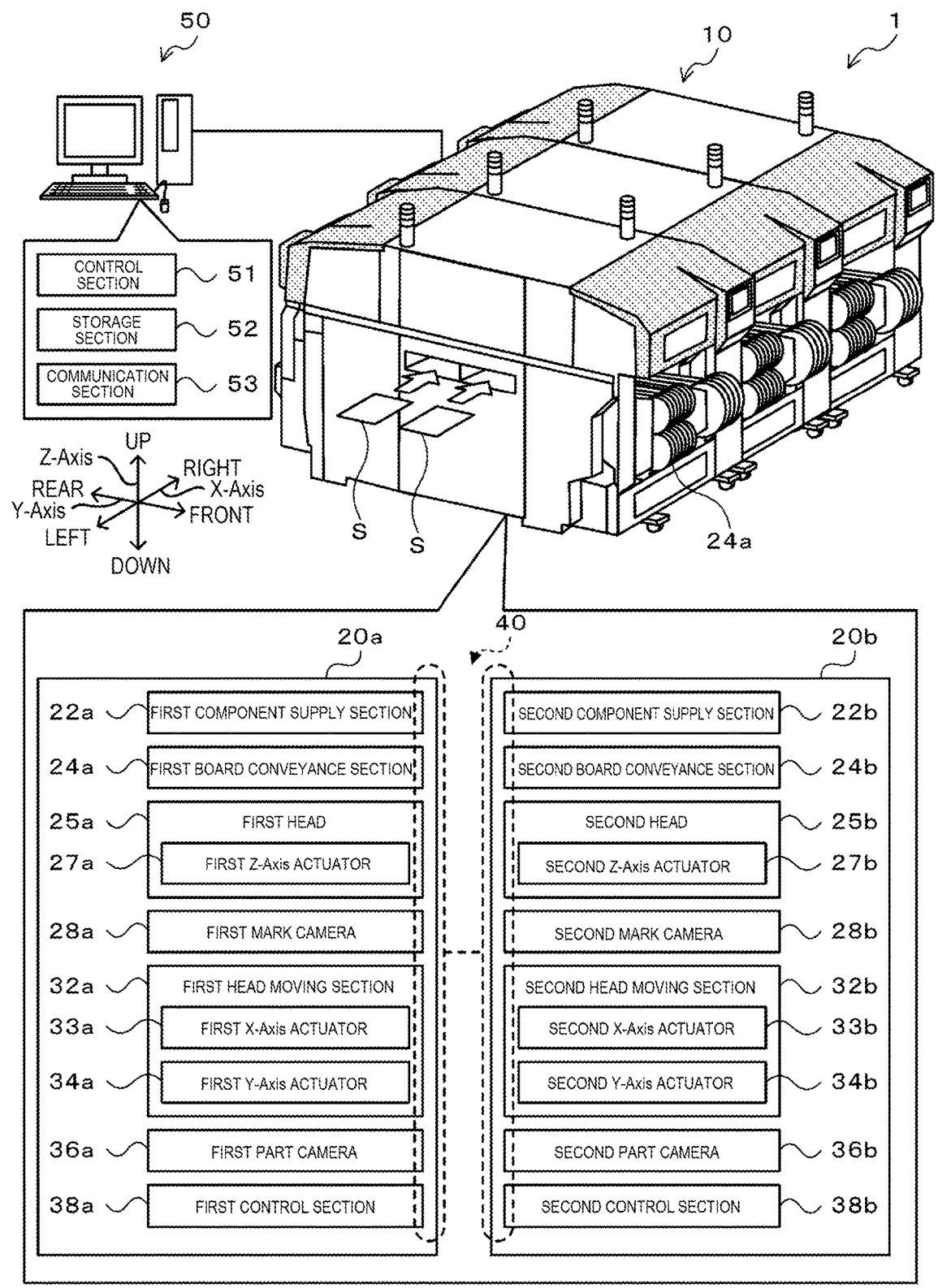
FIG. 1 is a schematic configuration diagram of mounting system 1.
Figure 2:
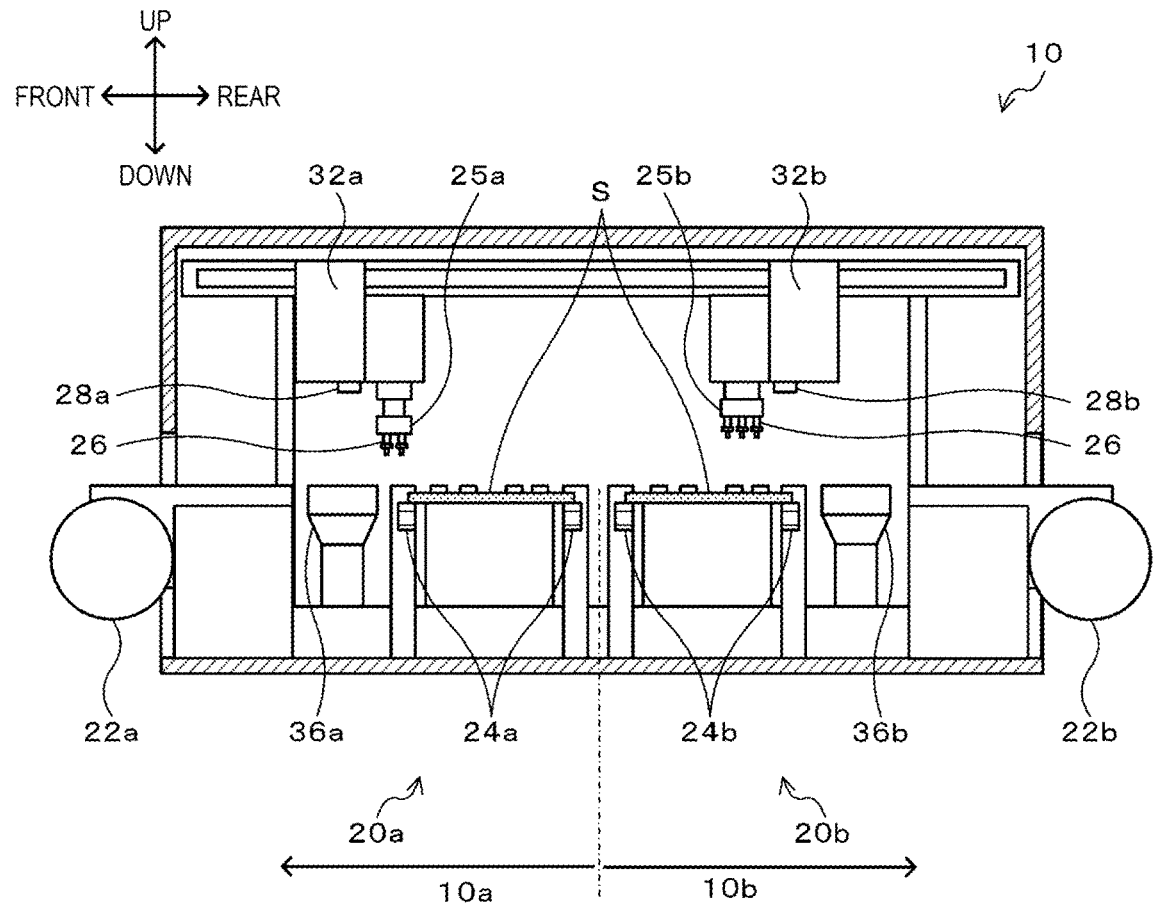
FIG. 2 is a schematic configuration diagram of mounting device 10.

Next, embodiments of the present disclosure will be described with reference to the drawings. FIG. 1 is a schematic configuration diagram of mounting system 1. FIG. 2 is a schematic configuration diagram of mounting device 10. In FIG. 1, a right-left direction is an X-axis direction, a front-rear direction is a Y-axis direction, and an up-down direction is a Z-axis direction.

Mounting system 1 includes multiple mounting devices 10 that execute a mounting process on a board, and management device 50 that manages the entire system, such as management of information on the mounting process in each mounting device 10. Multiple mounting devices 10 are disposed from an upstream side to a downstream side in a conveyance direction (the X-axis direction) of board S to constitute a production line. Mounting device 10 includes first mounting unit 20a provided on a front surface side of a device main body, second mounting unit 20b provided on a rear surface side of device main body, and communication system 40 that performs communication within each of units 20a and 20b and between units 20a and 20b. Mounting device 10 is configured to constitute a dual lane by first mounting unit 20a and second mounting unit 20b, and to perform mounting process on board S conveyed to the dual lane in parallel.

First mounting unit 20a includes first component supply section 22a, first board conveyance section 24a, first head 25a, first mark camera 28a, first head moving section 32a, first part camera 36a, and first control section 38a. Similarly, second mounting unit 20b includes second component supply section 22b, second board conveyance section 24b, second head 25b, second mark camera 28b, second head moving section 32b, second part camera 36b, and second control section 38b. Since each configuration of second mounting unit 20b is the same as each configuration of first mounting unit 20a, detailed descriptions thereof will be omitted.

First component supply section 22a is a section for supplying a component to be mounted mainly by first mounting unit 20a, and includes a feeder including a reel around which a tape accommodating the components is wound, a tray unit accommodating a tray on which the component is placed, and the like. Second component supply section 22b mainly supplies a component to be mounted on second mounting unit 20b. Mounting device 10 includes first component supply section 22a on a front surface of the device main body, and second component supply section 22b on a rear surface.

First board conveyance section 24a carries in, fixes, and unloads board S in the right-left direction (the X-axis direction) of one lane of the dual lanes. First board conveyance section 24a conveys board S by a pair of conveyor belts provided at intervals in the front-rear direction (the Y-axis direction) and spanned in the right-left direction.

First head 25a includes one or more suction nozzles 26 that picks up and holds the component removably mounted on a lower surface, and first Z-axis actuator 27a that moves suction nozzles 26 in the up-down direction (the Z-axis direction). Although not illustrated, first head 25a includes an actuator for rotating suction nozzle 26 about the Z-axis, an actuator for moving each suction nozzle 26 in the circumferential direction when multiple suction nozzles 26 are mounted, and the like. First mark camera 28a images a reference mark or the like attached to board S from the upper side. First mark camera 28a is provided on a lower surface of a slider of first head moving section 32a. It should be noted that first mark camera 28a may be provided on first head 25a.

First head moving section 32a includes first X-axis actuator 33a that moves the slider in the X-axis direction along the guide rail, and first Y-axis actuator 34a that moves the slider in the Y-axis direction along the guide rail. First head 25a is attached to the slider of the first head moving section 32a, and is moved in an XY direction by first head moving section 32a. It should be noted that a front side of an area defined by approximately the center of mounting device 10, that is, an area defined by a front-rear portion between first board conveyance section 24a and second board conveyance section 24b is defined as first area 10a, and a rear side thereof is defined as second area 10b. First head moving section 32a mainly moves first head 25a in first area 10a, and second head moving section 32b mainly moves second head 25b in second area 10b. However, depending on a component type to be supplied and board S to be mounted, first head moving section 32a may move first head 25a in second area 10b, or second head moving section 32b may move second head 25b in first area 10a.

For example, first part camera 36a images the component or the like held by suction nozzle 26 of first head 25a from below. First part camera 36a is disposed between first component supply section 22a and first board conveyance section 24a (refer to FIG. 2).

First control section 38a is configured as a microprocessor centered on CPU, and includes ROM for storing a processing program, RAM used as a work area, and the like. First control section 38a controls first component supply section 22a, first board conveyance section 24a, first head 25a (first Z-axis actuator 27a or the like), first mark camera 28a, first head moving section 32a (first X-axis actuator 33a or first Y-axis actuator 34a), first part camera 36a, and the like based on production information.

Figure 3:
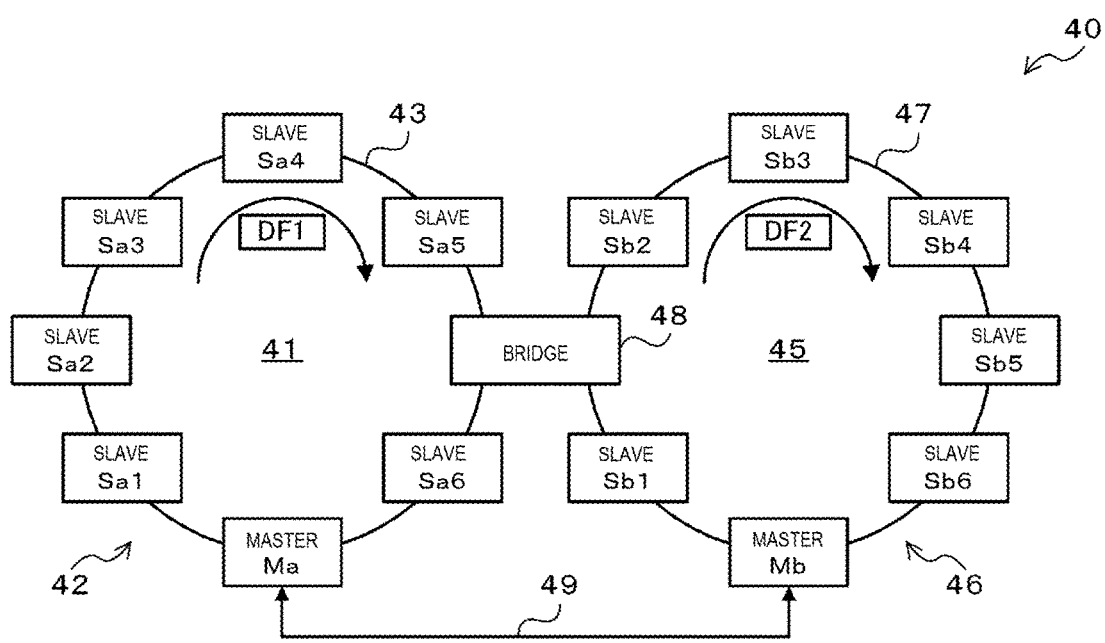
FIG. 3 is a schematic configuration diagram of communication system 40.

As illustrated in FIG. 3, communication system 40 includes first network 41, second network 45, and bridge 48. First network 41 includes multiple nodes 42 disposed in a ring shape, and each node 42 is connected to be able to perform communication based on a token passing method via communication line 43. Each node 42 sequentially transmits, from an upstream side to a downstream side in a communication direction, data frame DF1 in which data is stored, for example, with one direction such as the clockwise direction (refer to arrow) in FIG. 3 as the communication direction. In addition, first network 41 includes, as multiple nodes 42, one master node Ma responsible for communication control such as a transmission start of data frame DF1, and multiple slave nodes Sa (Sa1 to Sa6 or the like). For example, first control section 38a corresponds to master node Ma, and a control section that controls the motors and actuators of first component supply section 22a, first board conveyance section 24a, first head 25a, and first head moving section 32a, and a control section that controls imaging of first mark camera 28a and first part camera 36a correspond to slave nodes Sa1 to Sa6, respectively. In the present embodiment, a control section such as a servo controller for controlling first X-axis actuator 33a and first Y-axis actuator 34a of first head moving section 32a is disposed at a position adjacent to the upstream side in the communication direction with respect to bridge 48, that is, as slave node Say. The disposition positions of other nodes 42 (slave nodes Sa) are appropriately determined in consideration of wiring efficiency of communication line 43.

Here, in the example of FIG. 3, master node Ma transmits data frame DF1 to neighboring slave node Sa1. In data frame DF1, data necessary for each slave node Sa is stored together with a slave ID or the like of a destination. When data frame DF1 is transmitted from upstream node 42, each slave node Sa reads data corresponding to the slave ID or writes necessary data in association with the slave ID. For example, slave node Sa5 reads data relating to the control of first X-axis actuator 33a and first Y-axis actuator 34a from data frame DF1. In addition, slave node Sa5 writes position data or the like relating to the position of first head 25a moved under the control of first X-axis actuator 33a and first Y-axis actuator 34a to data frame DF1. That is, slave node Sa5 can write the latest position data of first head 25a to data frame DF1 and transmit the same to downstream bridge 48.

Similarly to first network 41, second network 45 includes multiple nodes 46 disposed in a ring shape, and each node 46 is connected to be able to perform communication based on a token passing method via communication line 47. Each node 46 sequentially transmits, from the upstream side to the downstream side in the communication direction, data frame DF2, for example, with one direction such as the clockwise direction in FIG. 3 as the communication direction. Similarly to first network 41, second network 45 includes one master node Mb responsible for communication control and multiple slave nodes Sb (Sb1 to Sb6 or the like). For example, second control section 38*b* corresponds to master node Mb, and a control section that controls the motors and actuators of second component supply section 22*b*, second board conveyance section 24*b*, second head 25*b*, and second head moving section 32*b*, and a control section that controls the imaging of second mark camera 28*b* and second part camera 36*b* correspond to multiple slave nodes Sb1 to Sb6, respectively. In the present embodiment, a control section such as a servo controller for controlling second X-axis actuator 33*b* and second Y-axis actuator 34*b* of second head moving section 32*b* is disposed at a position adjacent to the downstream side in the communication direction with respect to bridge 48, that is, as slave node Sb2. The disposition positions of other nodes 46 (slave nodes Sb) are appropriately determined in consideration of wiring efficiency of communication line 47. Since data frame DF2 has the same configuration as data frame DF1, a description thereof will be omitted.

Bridge 48 communicably connects first network 41 and second network 45. Bridge 48 transmits data frame DF1 transmitted from slave node Sa5 on the upstream side in the communication direction to slave node Sa6 on the downstream side in first network 41. In addition, bridge 48 transmits data frame DF2 transmitted from slave node Sb1 on the upstream side in the communication direction to slave node Sb2 on the downstream side in second network 45. Bridge 48 can read necessary data from data frame DF1 and write the data to data frame DF2, and can read necessary data from data frame DF2 and write the data to data frame DF1.

First network 41 and second network 45 have the same communication cycle, and perform communication at several hundred μsec (predetermined time) such as 200 μsec. In the present embodiment, by dividing the network into two networks such as first network 41 and second network 45, it is possible to shorten the communication cycle and suppress occurrence of an operation delay or the like as compared with one network. In the present embodiment, master node Ma of first network 41 and master node Mb of second network 45 are connected by communication line 49 so as to be able to communicate with each other.

As illustrated in FIG. 1, management device 50 includes control section 51, storage section 52, and communication section 53. Control section 51 is configured as a microprocessor centered on a CPU, and includes a ROM for storing a processing program, a RAM used as a work area, and the like. Storage section 52 is configured by an HDD or the like that stores various information. Communication section 53 is an interface for exchanging information with mounting device 10 or the like. Storage section 52 stores production information and the like in the mounting process of mounting device 10. The production information includes types of components to be mounted on board S, the number of components, a disposition position of the component, a mounting order of the components, and the like. Management device 50 outputs the production information to first control section 38*a* and second control section 38*b* of mounting device 10 before the mounting process is started. Master node Ma serving as first control section 38*a* writes necessary data based on the production information to data frame DF1 to start communication in first network 41. In addition, master node Mb serving as second control section 38*b* writes necessary data based on production information to data frame DF2 to start communication in second network 45.

Figure 4:
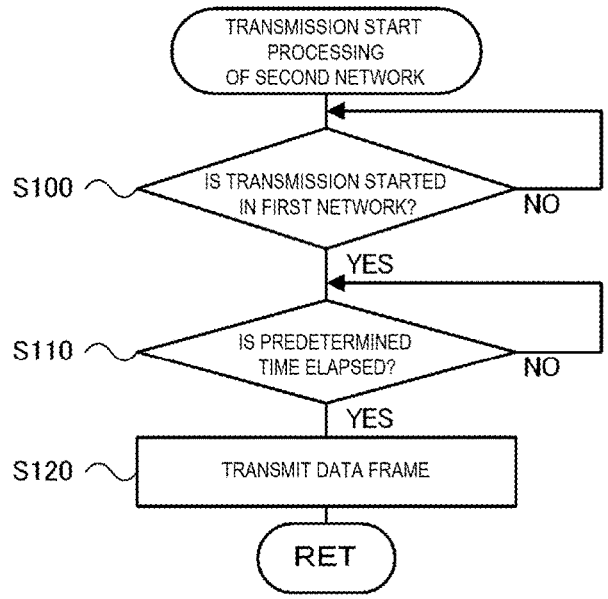
FIG. 4 is a flowchart illustrating an example of transmission start processing of a second network.
Figure 5:
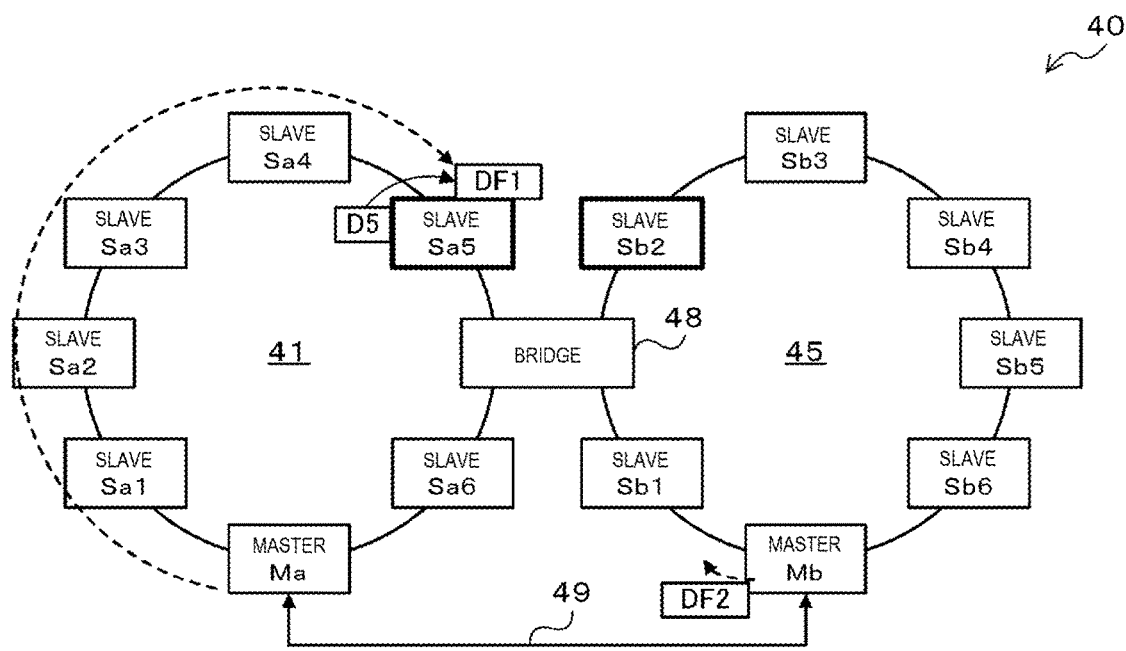
FIG. 5 is an explanatory diagram illustrating a state of transmission of data frames DF1 and DF2.
Figure 6:
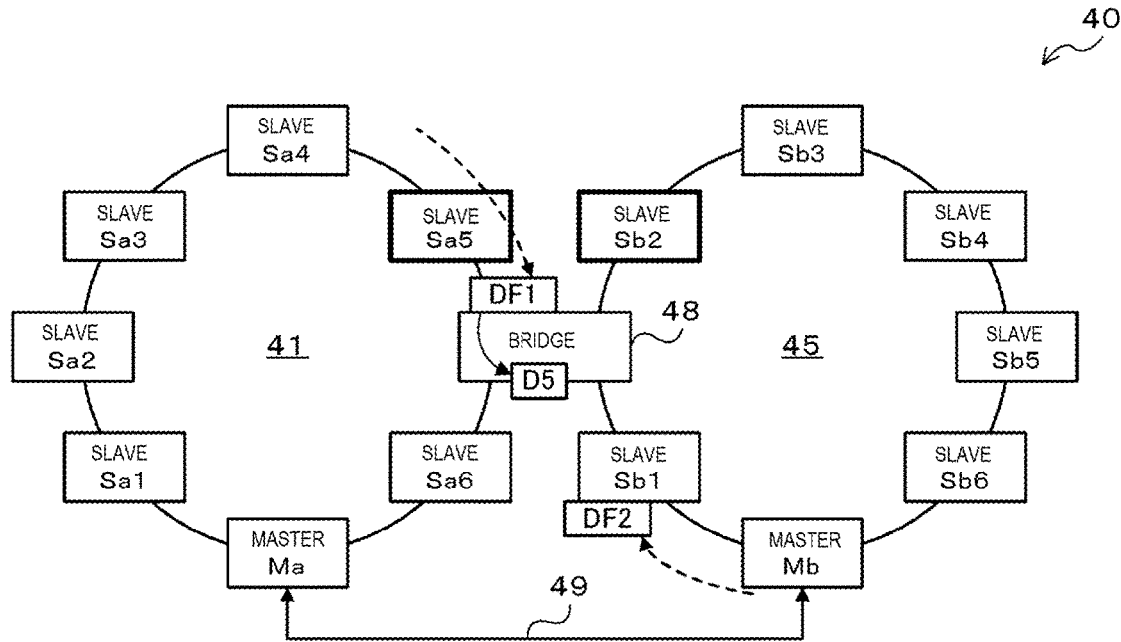
FIG. 6 is an explanatory diagram illustrating the state of the transmission of data frames DF1 and DF2.
Figure 7:
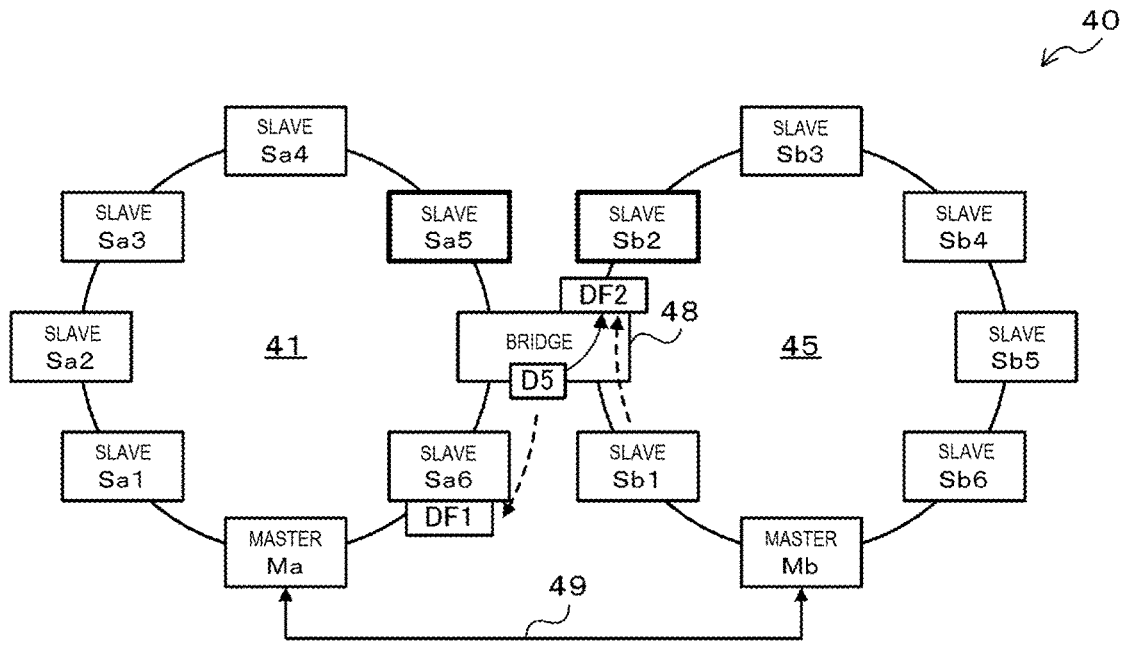
FIG. 7 is an explanatory diagram illustrating the state of the transmission of data frames DF1 and DF2.
Figure 8:
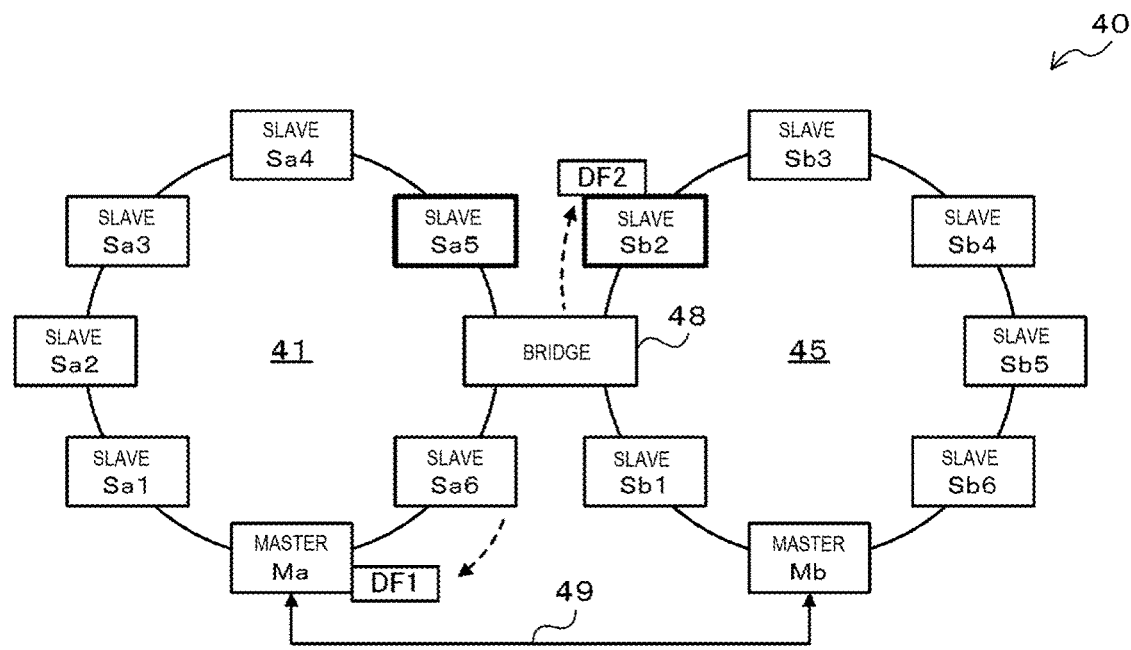
FIG. 8 is an explanatory diagram illustrating the state of the transmission of data frames DF1 and DF2.

Communication processing in communication system 40 of mounting device 10 configured as described above will be described below. FIG. 4 is an explanatory diagram illustrating an example of the transmission start processing of the second network. The transmission start processing in FIG. 4 is executed by master node Mb of second network 45. In this processing, first, master node Mb waits until the transmission of data frame DF1 is started in first network 41 (S100). It should be noted that master node Ma notifies master node Mb of transmission start of data frame DF1 via communication line 49. Master node Mb recognizes that the transmission of data frame DF1 is started in first network 41 by the notification. It should be noted that master node Ma and master node Mb may notify the transmission start by direct I/O or the like.

When the transmission of data frame DF1 is started, master node Mb waits until a predetermined time (delay time) elapses (S110). The predetermined time is defined as a time period for adjusting the timing so that data frame DF2 is transmitted to bridge 48 after data frame DF1 is transmitted to bridge 48 in one communication cycle. For example, the predetermined time is determined based on a difference between an average time required for data frame DF1 transmitted from master node Ma to reach bridge 48 and an average time required for data frame DF2 transmitted from master node Mb to reach bridge 48. When the predetermined time elapses in S110, master node Mb transmits data frame DF2 to slave node Sb1 (S120), and terminates the transmission start processing.

FIGS. 5 to 8 are explanatory diagrams illustrating how data frames DF1 and DF2 are transmitted. Since the transmission of data frames DF1 and DF2 is started with a predetermined time difference, for example, when data frame DF1 is in slave node Sa5, the transmission of data frame DF2 is started (refer to FIG. 5). As described above, slave node Sa5 writes data D5 such as the latest position data of first head 25*a* to data frame DF1 and transmits the same to bridge 48. When data frame DF1 is transmitted, bridge 48 reads data that needs to be transferred, such as data D5, from data frame DF1 (refer to FIG. 6). In addition, when data frame DF2 is transmitted after data frame DF1 is transmitted, bridge 48 writes necessary data such as data D5 to data frame DF2 (refer to FIG. 7), and then transmits the same to slave node Sb2 on the downstream side (refer to FIG. 8). As a result, data frame DF2 to which the necessary data such as data D5 is copied from data frame DF1 reaches slave node Sb2. Therefore, slave node Sb2 can grasp the latest position data of first head 25*a* by reading data D5 from data frame DF2.

As described above, first head moving section 32*a* may move first head 25*a* in second area 10*b*, or second head moving section 32*b* may move second head 25*b* in first area 10*a*. Even in this case, the disposition positions and the mounting order of the respective components are determined by the production information so that first head 25*a* and second head 25*b* do not interfere with each other. However, in order to reliably protect the facility, mounting device 10 needs to monitor the movement positions of first head 25*a* and second head 25*b* during mounting, and urgently stop both heads when there is a risk of collision. Since slave node Sb2 can grasp the latest position data of first head 25*a* from data frame DF2, it is possible to promptly and urgently stop second head 25*b* in a case where there is a risk of collision between the two heads. It should be noted that bridge 48 is assumed to read the position data of second head 25*b* from data frame DF2 and write the position data to data frame DF1. Therefore, slave node Sb1 can grasp the position data of second head 25*b* one cycle before data frame DF1, and can urgently stop first head 25*a*. In the present embodiment, it is disposed so as to cause slave node Sb2 to detect the risk of collision first, and thus, an early response can be made so as to urgently stop second head 25b.

Here, correspondences between constituent elements of the present embodiment and constituent elements of the present disclosure will be clarified. Communication system 40 of the present embodiment corresponds to a communication system, first network 41 and second network 45 correspond to a network, bridge 48 corresponds to a bridge, nodes 42 and 46 correspond to nodes, and slave nodes Sa5 and Sb2 correspond to specific nodes. Master nodes Ma and Mb correspond to master nodes. First head 25a and second head 25b correspond to a working section, first head moving section 32a and second head moving section 32b correspond to moving sections, and mounting device 10 corresponds to a work apparatus.

In communication system 40 of the embodiment described above, slave node Sa5 for controlling first head moving section 32a is disposed at a position adjacent to bridge 48 on the upstream side in the communication direction, and slave node Sb2 for controlling second head moving section 32b is disposed at a position adjacent to bridge 48 on the downstream side in the communication direction. Therefore, it is possible to promptly transfer necessary data such as the latest position data of first head 25a from slave node Sa5 to slave node Sb2 via bridge 48. Slave node Sb2 can grasp the latest position data of first head 25a, and control second head 25b so as to prevent collision between first head 25a and second head 25b.

In addition, first network 41 and second network 45 have the same communication cycle, and are adjusted so that the timings at which data frames DF1 and DF2 are transmitted to bridge 48 are delayed in second network 45 with respect to first network 41. As a result, since the latest data can be transferred from slave node Sa5 to slave node Sb2 within one communication cycle, the responsiveness can be improved.

In addition, master node Mb transmits data frame DF2 with a predetermined time delay after receiving the notification that data frame DF1 has been transmitted from master node Ma. Therefore, with a simple configuration for communicably connecting master nodes Ma and Mb, it is possible to appropriately adjust the timings at which data frames DF1 and DF2 are transmitted to bridge 48.

Needless to say, the present disclosure is not limited to the embodiment that has been described heretofore in any way, and hence, the present disclosure can be carried out in various aspects without departing from the technical scope of the present disclosure.

For example, in the above-described embodiment, the timing is adjusted by communicably connecting master nodes Ma and Mb, but the configuration is not limited to this, and the timing may be adjusted by other configurations and methods. For example, bridge 48 may adjust the timing by changing the opening/closing timing of a communication port and shifting changing the timing of transmitting/receiving data frame DF1 of first network 41 and the timing of transmitting/receiving data frame DF2 of second network 45. Alternatively, the configuration is not limited to such timing adjustment, and the timing adjustment may not be performed. In addition, although the communication cycles between first network 41 and second network 45 are assumed to be the same, the configuration is not limited to this, and the communication cycles of multiple networks may be different from each other.

In the above embodiment, slave node Sa5 for controlling first head moving section 32a is disposed at the position adjacent to bridge 48 on the upstream side in the communication direction in first network 41, but the configuration is not limited to this. For example, the slave node for controlling first head moving section 32a may be disposed at a position within a half circumference on the upstream side in the communication direction with respect to bridge 48. That is, in the disposition of FIG. 3, the node for controlling first head moving section 32a may be any of slave nodes Sa2 to Sa5, and slave node Sa5 closest to bridge 48 is most preferable.

In the above embodiment, slave node Sb2 for controlling second head moving section 32b is disposed at the position adjacent to bridge 48 on the downstream side in the communication direction in second network 45, but the configuration is not limited to this. For example, the slave node for controlling second head moving section 32b may be disposed at a position within a half circumference on the downstream side in the communication direction with respect to bridge 48. That is, in the disposition of FIG. 3, the node for controlling second head moving section 32b may be any of slave nodes Sb2 to Sb5, and slave node Sb2 closest to bridge 48 is most preferable.

In the above embodiment, the slave node for controlling first head moving section 32a is disposed on the upstream side of bridge 48 in first network 41, and the slave node for controlling second head moving section 32b is disposed on the downstream side of bridge 48 in second network 45, but the configuration is not limited to this. For example, in first network 41, the slave node (that is, Sa6) for controlling first head moving section 32a may be disposed on the downstream side of bridge 48, and in second network 45, the slave node (that is, Sb1) for controlling second head moving section 32b may be disposed on the upstream side of bridge 48. In such a case, when there is a risk that both heads collide with each other, first head moving section 32a may be controlled so as to urgently stop first head 25a.

In the above embodiment, communication system 40 includes two ring-type networks (first network 41 and second network 45), and bridge 48 that connects the networks, but the configuration is not limited to this. For example, communication system 40 may include three or more ring-type networks and the bridge that connect the networks. For example, in the disposition of FIG. 3, a bridge for connecting to a third network may be provided at a position adjacent to a downstream side in the communication direction of slave node Sb2 which is the specific node, and the specific node may be provided at a position adjacent to the bridge on the downstream side in the communication direction in the third network. In addition, although a ring type network is exemplified, the configuration is not limited to this, and any network that performs communication by a token passing method may be used.

In the above embodiment, mounting device 10 for mounting components on board S is exemplified as the work apparatus, but the configuration is not limited to this, but mounting device 10 may include any device as long as it includes two heads for performing a work on board S, such as a printing device for performing printing on board S or an inspection device for performing inspection on board S. In addition, the configuration is not limited to performing a work on board S. As the work apparatus, any device may be used as long as it includes multiple work units including a working section for executing a predetermined work and a moving section for moving the working section, and a communication unit for performing communication through a token passing type network for controlling each work unit. For example, the work apparatus may be applied to a work robot in which the working section is an end effector at a distal end of a robot arm and the moving section is a robot arm may be used as a work unit, and a work range (moving range of the end effector) of each work robot may overlap with each other.

Here, the communication system of the present disclosure may be configured as follows. For example, in the communication system of the present disclosure, the specific node may be disposed at a position adjacent to the bridge on the upstream side in the communication direction in the one network. According to this configuration, since the data frame can be transmitted from the specific node to the bridge in one network promptly, it is possible to perform the transfer of data between the specific nodes more promptly.

In the communication system of the present disclosure, the specific node may be disposed at a position adjacent to the bridge on the downstream side in the communication direction in the other network. According to this configuration, since the data frame can be transmitted from the bridge to the specific node promptly in the other network, it is possible to perform the data transfer between the specific nodes more promptly.

In the communication system of the present disclosure, the one network and the other network may have the same communication cycle, and a timing at which the data frame is transmitted from the node on the upstream side in the communication direction to the bridge may be adjusted to be later in the other network than the one network. This makes it possible to transfer data from the specific node of one network to the specific node of the other network via the bridge within one communication cycle. Therefore, the latest data can be transferred between specific nodes, and thus, the responsiveness can be improved.

In the communication system of the present disclosure, the network may have a master node configured to control transmission start of the data frame, the one network and the other network may be connected such that the master nodes thereof communicate with each other separately from the bridge, and the master node of the other network may adjust the timing by transmitting the data frame with a predetermined time delay after receiving a notification that the data frame has been transmitted from the master node of the one network. Accordingly, by connecting the master nodes to each other, it is possible to appropriately adjust the timing of transmission to the bridge to suppress a decrease in the responsiveness.

The work apparatus of the present disclosure is a work apparatus including: multiple work units including a working section configured to execute a predetermined work and a moving section configured to move the working section; and any of the communication systems described above, in which the specific node reads and writes data relating to a movement position of the working section in the data frame and controls the moving section.

Similar to any of the communication systems described above, the work apparatus of the present disclosure can promptly exchange data between the specific nodes to suppress a decrease in responsiveness. Therefore, it is possible to prevent the movements of the working sections from interfering with each other due to the decrease of the responsiveness.

INDUSTRIAL APPLICABILITY

The present disclosure can be applied to a manufacturing industry of a work apparatus such as a communication system or a mounting device.

REFERENCE SIGNS LIST

1: mounting system, 10: mounting device, 10a: first area, 10b: second area, 20a: first mounting unit, 20b: second mounting unit, 22a: first component supply section, 22b: second component supply section, 24a: first board conveyance section, 24b: second board conveyance section, 25a: first head, 25b: second head, 26: suction nozzle, 27a: first Z-axis actuator, 27b: second Z-axis actuator, 28a: first mark camera, 28b: second mark camera, 32a: first head moving section, 32b: second head moving section, 33a: first X-axis actuator, 33b: second X-axis actuator, 34a: first Y-axis actuator, 34b: second Y-axis actuator, 36a: first part camera, 36b: second part camera, 38a: first control section, 38b: second control section, 40: communication system, 41: first network, 42, 46: node, 43, 47: communication line, 45: second network, 48: bridge, 49: communication line, 50: management device, 51: control section, 52: storage section, 53: communication section, S: board

The invention claimed is:

1. A communication system comprising:
multiple token passing type networks in which multiple nodes are disposed with one direction as a communication direction; and
a bridge configured to communicatively connect the networks,
wherein the multiple nodes sequentially transmit a data frame along the communication direction, read and write data from and to the data frame, and include a specific node requiring data in the data frame transmitted by another network,
the bridge transmits, in each of the networks of a connection destination, the data frame transmitted from the node on an upstream side to the node on a downstream side in the communication direction, reads data from the transmitted data frame, and writes the data to the data frame of another network to transmit the data, and
in one network of the networks connected to a common bridge, the specific node is disposed within a half circumference of disposition positions of the multiple nodes on the upstream side in the communication direction with respect to the bridge, and in an other network of the networks, the specific node is disposed within a half circumference of the disposition positions of the multiple nodes on the downstream side in the communication direction with respect to the bridge,
wherein the one network and the other network have a same communication cycle, and a timing at which the data frame is transmitted from the node on the upstream side in the communication direction to the bridge is adjusted to be later in the other network than the one network.

2. The communication system according to claim 1, wherein the specific node is disposed at a position adjacent to the bridge on the upstream side in the communication direction in the one network.

3. The communication system according to claim 1, wherein the specific node is disposed at a position adjacent to the bridge on the downstream side in the communication direction in the other network.

4. The communication system according to claim 1,
wherein the network has a master node configured to control transmission start of the data frame,
the one network and the other network are connected such that the master nodes thereof communicate with each other separately from the bridge, and
the master node of the other network adjusts the timing by transmitting the data frame with a predetermined time delay after receiving a notification that the data frame has been transmitted from the master node of the one network.

5. A work apparatus comprising:
multiple work units including a working section configured to execute a predetermined work and a moving section configured to move the working section; and
a communication system comprising:
  multiple token passing type networks in which multiple nodes are disposed with one direction as a communication direction; and
  a bridge configured to communicatively connect the networks,
  wherein the multiple nodes sequentially transmit a data frame along the communication direction, read and write data from and to the data frame, and include a specific node requiring data in the data frame transmitted by another network,
  the bridge transmits, in each of the networks of a connection destination, the data frame transmitted from the node on an upstream side to the node on a downstream side in the communication direction, reads data from the transmitted data frame, and writes the data to the data frame of another network to transmit the data, and
  in one network of the networks connected to a common bridge, the specific node is disposed within a half circumference of disposition positions of the multiple nodes on the upstream side in the communication direction with respect to the bridge, and in an other network of the networks, the specific node is disposed within a half circumference of the disposition positions of the multiple nodes on the downstream side in the communication direction with respect to the bridge,
wherein the specific node reads and writes data relating to a movement position of the working section in the data frame and controls the moving section.

* * * * *